(12) United States Patent
Sawa et al.

(10) Patent No.: US 6,435,854 B1
(45) Date of Patent: Aug. 20, 2002

(54) APPARATUS FOR MIXING AND INJECTION MOLDING THERMOSETTING POLYURETHANE

(76) Inventors: Eiji Sawa, 170 Brittany La., Pittsford, NY (US) 14534; Kenichi Kawamoto, 302 Annie La., Rochester, NY (US) 14626; Gary L. Raikea, 5420 W. 15th St., Speedway, IN (US) 46224

( * ) Notice: Subject to any disclaimer, the term of this patent is extended or adjusted under 35 U.S.C. 154(b) by 0 days.

(21) Appl. No.: 09/438,211

(22) Filed: Nov. 12, 1999

(51) Int. Cl.$^7$ .............................................. B29C 45/17
(52) U.S. Cl. ...................................... 425/130; 425/564
(58) Field of Search ................................ 425/130, 561, 425/562, 64; 366/181.5, 162.4, 162.5, 340

(56) References Cited

U.S. PATENT DOCUMENTS

| | | | |
|---|---|---|---|
| 2,021,092 A | * 11/1935 | Teliet | 366/131 |
| 4,060,223 A | * 11/1977 | Bongartz et al. | 366/179.1 |
| 4,314,963 A | 2/1982 | Boden et al. | |
| 4,457,887 A | 7/1984 | Porsche | |
| 4,560,284 A | * 12/1985 | Chen | 366/336 |
| 4,573,900 A | * 3/1986 | Smith | 425/157 |
| 4,726,933 A | 2/1988 | Mayr et al. | |
| 4,890,662 A | * 1/1990 | Sanchez-Caldera et al. | 164/46 |
| 4,964,732 A | * 10/1990 | Cadeo et al. | 366/159 |
| 5,002,475 A | 3/1991 | Graefe | |
| 5,223,599 A | 6/1993 | Gajewski | |
| 5,372,789 A | 12/1994 | Lamberts et al. | |
| 5,382,603 A | 1/1995 | Krippl et al. | |
| 5,427,720 A | * 6/1995 | Kotzab | 264/40.6 |
| 5,464,585 A | * 11/1995 | Fitzgibbon | 264/108 |
| 5,882,693 A | * 3/1999 | Silkowski et al. | 425/130 |
| 5,980,836 A | * 11/1999 | Moffett et al. | 422/129 |
| 6,062,841 A | * 5/2000 | Gellert et al. | 425/130 |

* cited by examiner

*Primary Examiner*—Nam Nguyen
*Assistant Examiner*—Emmanual Luk
(74) *Attorney, Agent, or Firm*—Stephen B. Salai, Esq.; Brian B. Shaw, Esq.; Harter, Secrest & Emery LLP

(57) ABSTRACT

The invention is an apparatus for mixing and injection molding thermosetting polyurethane. The invention involves using a premixer comprising of a series of specially designed premixing chambers, one or more static, rather than dynamic, mixers, and a specially designed dual-path mixer. After the material is mixed it is pumped into an injector, and then deposited into a mold. This entire process is accomplished in an airtight environment. The mold into which the material is pumped is attached to a vacuum that decreases the chances of any air bubbles being trapped inside the mold. New features of the apparatus include a dual-path mixer and a newly designed premixing chamber.

9 Claims, 5 Drawing Sheets

Flow from Mixing Process

APPARATUS FOR MIXING AND INJECTION MOLDING THERMOSETTING POLYURETHANE

FIELD OF THE INVENTION

This invention relates to methods of producing molded precision polyurethane products, especially charging rollers. It further relates to apparatuses for producing such products

BACKGROUND OF THE INVENTION

Common processes for thermosetting polyurethane include casting and reaction injection molding (RIM). However, there are some limitations to both of these processes.

Generally, in casting processes, each component of the resin is mixed in a dynamic rotary pin or propeller mixer, and the mixed material is then poured into an open mold. Sometimes, the mold is sealed with an upper side mold piece after the mixed material is poured into the bottom side mold piece. Because the process is done in an open air atmosphere, it is difficult to eliminate air bubbles from the molded parts.

Casting processes are primarily used in the industry for thermosetting polyurethane rollers for paper handling, or for electric and static controlling rollers. Generally, a quadrilateral mold or a U-shaped mold is used for casting a cylindrical part with a shaft at its center. The shapes of these molds lead to a big loss of material and additional grinding processes. Additionally, it is very difficult to prevent air bubbles from forming in the molded parts. This is because after the material is mixed, the material is handled in an open atmosphere environment prior to pouring it into an open mold.

Furthermore, it is very important, especially for a highly functional molded part such as a charging roller for a photo conductor of an electrophotographic printing system, for the final mixture to have uniform properties. However, it is difficult to make uniformly molded parts using a quadrilateral mold or a U-shaped mold, because it is difficult to keep the mixture at a uniform temperature both because it is difficult to apply heat to the mixture uniformly and because thermosetting polyurethane generates heat. These problems lead to different heat histories encapsulated in the same molded part.

RIM processes are very good processes for producing specially designed foam-molded parts. RIM processes generally involve mixing components at high pressures. Components are injected at very high pressures into a very tough mold that is holed in a press. The mold is kept highly pressurized, so that the curing time is kept short, and process efficiency is increased. This is a big limitation of RIM processes. It is difficult to make a softer thermosetting polyurethane resin using a RIM process because of the generally longer curing time.

It is possible to apply RIM processes to mold solid thermosetting polyurethane, but it is difficult to avoid getting air bubbles in the molded parts due to the high pressure mixing system.

It is also evident from the fact that almost nobody is using RIM processes to make rollers that RIM processes are not good processes for this industry.

In the liquid silicone industry, some people use a third system to make molded parts. Each component is injected into a static mixer using syringe type metering pumps, and the mixture is injected into a mold directly from the outlet side of the mixer. This is sometimes referred to as liquid injection molding (LIM). This system is possible in liquid silicone systems because of liquid silicone's profile of reaction, and its particular component system. Generally, silicone suppliers supply liquid silicone systems as one or two component systems. For molded parts, generally two component systems are popular. The flow rate and the viscosity of each component are generally equal. The reason this is possible in the silicone industry is that oil or other additives may be added to adjust the rate of flow and viscosity. However, additives cannot be used to make most thermosetting polyurethane products especially for high performance parts. In order to avoid inferior quality polyurethane products, we need to reduce the presence of components that cannot chemically react.

Additionally, we do not need to heat up the components in a liquid silicone system, so it is easy to control the reaction speed.

However, this LIM system does not work well for thermosetting polyurethane, except in very limited systems, such as where we have a two component system, where the two components are mixed in roughly the same proportions, where the viscosity of the two components is almost the same, and where the chemical reaction speed is very slow at room temperature. Most compositions of thermosetting polyurethane products do not possess such ideal properties.

SUMMARY OF THE INVENTION

The primary objective of the invention was to devise a method and apparatus for making molded thermosetting polyurethane parts at a lower cost, with lower material loss, and with a lower scrap rate. Subordinate to this main goal, was the secondary goal of increasing the homogeneity of a mixture containing materials that varied widely in amounts and viscosity.

In order to create a cost-effective and high-performance process of making molded thermosetting polyurethane parts and rollers, we have developed a complete molding system and a process for using it. It uses some concepts that already exist in the prior art, but combines them in a new manner. Two components of the mixing system, the premixing chamber and the dual-path mixer, are also claimed as separate inventions.

The invention is a method and apparatus for mixing and injection molding thermosetting polyurethane. The invention involves using a premixer that comprises a series of specially designed premixing chambers, one or more static, rather than dynamic, mixers, and a specially designed dual-path mixer. After the material is mixed it is pumped into an injector, and then deposited into a mold.

This entire process is accomplished in an airtight environment. Valve systems are in place both before the premixer and after the dual-path mixer. The injector is hermetically attached to an inlet of the mold. The mold into which the material is pumped is attached to a vacuum pump that decreases the chances of any air bubbles being trapped inside the mold.

This invention also increases the quality of injection molded parts by increasing the homogeneity of the mixture prior to molding. Doing this ensures that the end products of production will be uniform throughout. This is accomplished in part by utilizing a new dual-path mixer. A new type of premixing chamber further increases the blending of the individual components.

Another, more specific objective of this invention was to devise a method and apparatus for making functional thermosetting polyurethane rollers with highly uniform properties. This method and apparatus generates high quality polyurethane rollers.

While this system will work for many different compositions of thermosetting polyurethane, it handles the following situations especially well:

(1) molding systems where more than two components make up the final material;

(2) molding systems where the components are present in differing amounts, such as where the ratio of two components is 2:1 or greater;

(3) molding systems where the viscosity of the mixture is over 2000 cps at the molding temperature;

(4) molding systems where there is a big difference in viscosity of components;

(5) molding systems where the pot-life of mixture at the molding temperature is between 3 minutes and 60 minutes.

DETAILED DESCRIPTION OF THE PREFERRED EMBODIMENT

The invention is a method and apparatus for mixing and injection molding thermosetting polyurethane. It uses a number of concepts that already exist in the prior art, but combines them in a new manner. It also utilizes two new features: a novel premixing chamber, and a dual-path mixer.

We will describe the premixing chamber and the dual-path mixer in detail before going discussing the whole procedure for injection molding thermosetting polyurethane.

The Premixing Chamber

We found that it was possible to avoid a shortage of components present in lesser relative amounts in a mixture by using either multiple two-component premixing chambers or one extended premixer. We further found that the optimal configuration of the premixing chamber or chambers should be similar to that illustrated in either FIG. 2 or FIG. 3.

Figure 2:
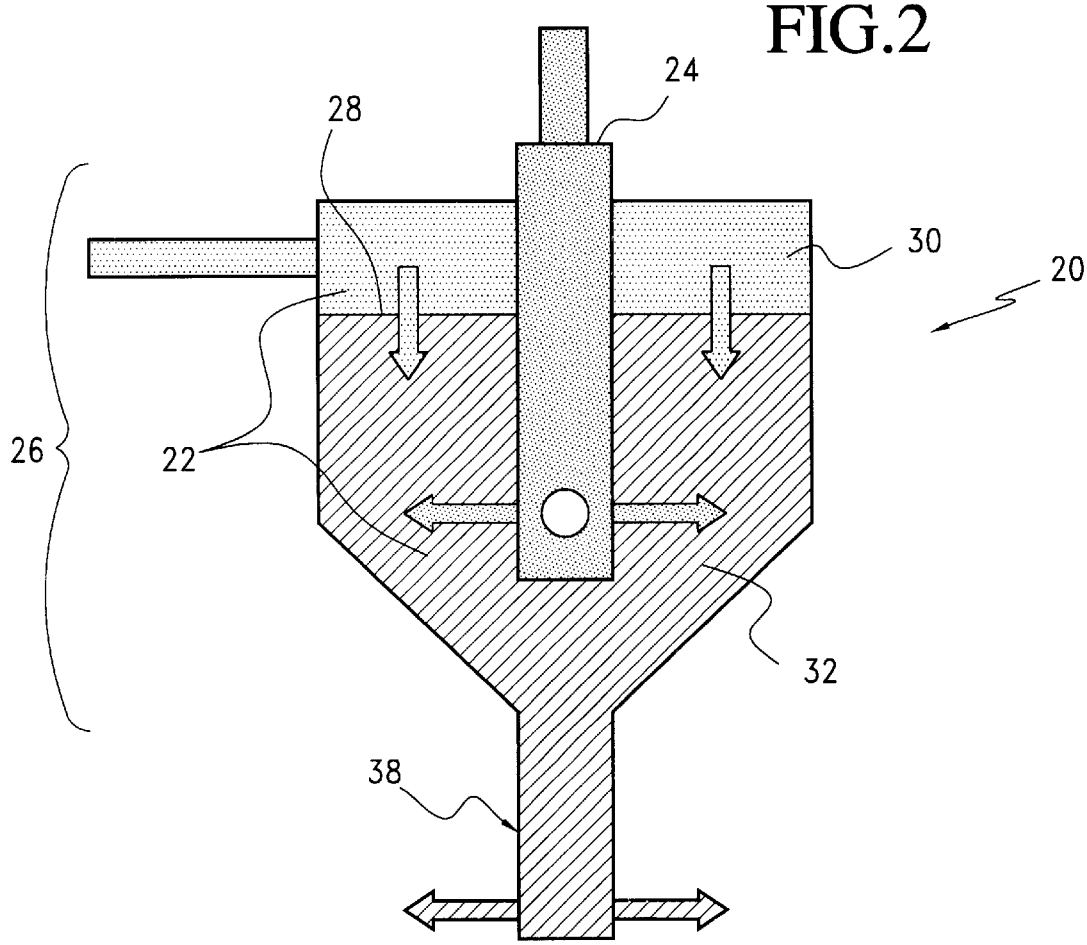
FIGS. 2, 2A, 2B and 2C are an illustration of a solitary premixing chamber unit or portions thereof.
Figure 2A:
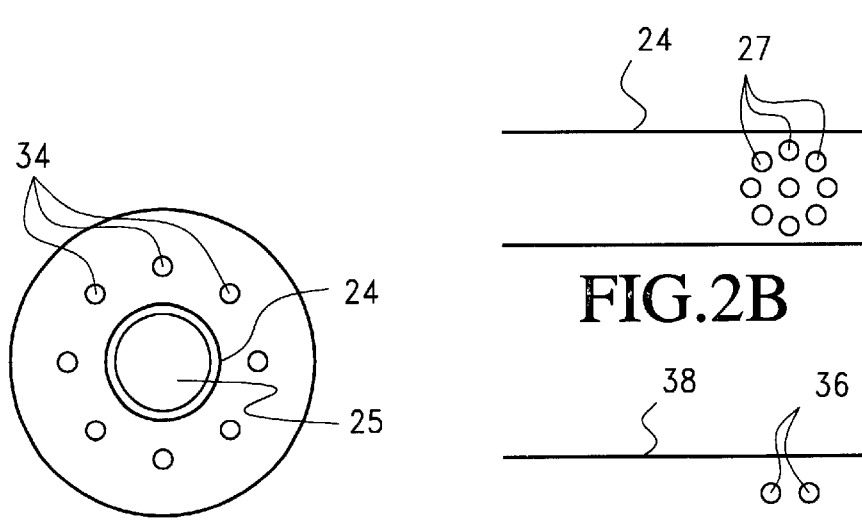
Figure 2B:
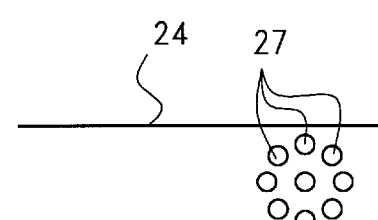
Figure 2C:
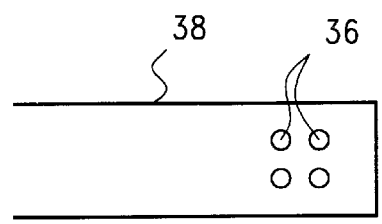

FIG. 2 illustrates a novel premixing chamber. This chamber is the base element of either a chain of premixing chambers or a single extended premixing chamber. Neither the tube 24, nor the outer body 26 needs to be any particular shape. The shape of the premixing chamber is not an integral part of the design. Nor does the inner passage have to be concentric with or share any symmetry with the outer body. The barrier separating region 30 from region 32 may be placed at any point that is midway between the entrance and the exit.

Premixing chamber 20 has a hollow interior 22 with a tube 24 running through it, concentric with the axis of the larger body 26, which terminates before reaching the far end of the chamber. It also has a barrier 28 midway along the longitudinal axis, dividing the chamber into an anterior region 30 and a posterior region 32. The barrier does not obstruct flow through the center tube. The barrier has a plurality of holes 34 in it, through which material may flow from the anterior region 30 to the posterior region 32.

The material that is present in a lesser amount enters through the center tubular passageway 25. It exits the tube into the posterior region 32 through the plurality of holes 27 surrounding the end of the passage. The material that is present in the greater amount enters the larger anterior region 30. It then flows into the posterior region 32 through the holes 34 in the barrier wall.

The material is then funneled out of the chamber into a tube 38 opposite the barrier 28. The tube has a plurality of holes 36. When the posterior region 32 is sufficiently filled, the contents flow out through the holes 36 and continue on to the rest of the mixing process.

This may include another two-component premixing chamber. If this is the case, material exiting the first mixing chamber flows into the center entrance tube of a new premixing chamber. Simultaneously, a third component will enter the anterior region of the second premixing chamber. This concept may be extended so that for N components we would have N−1 premixing chambers connected in series.

Figure 3:
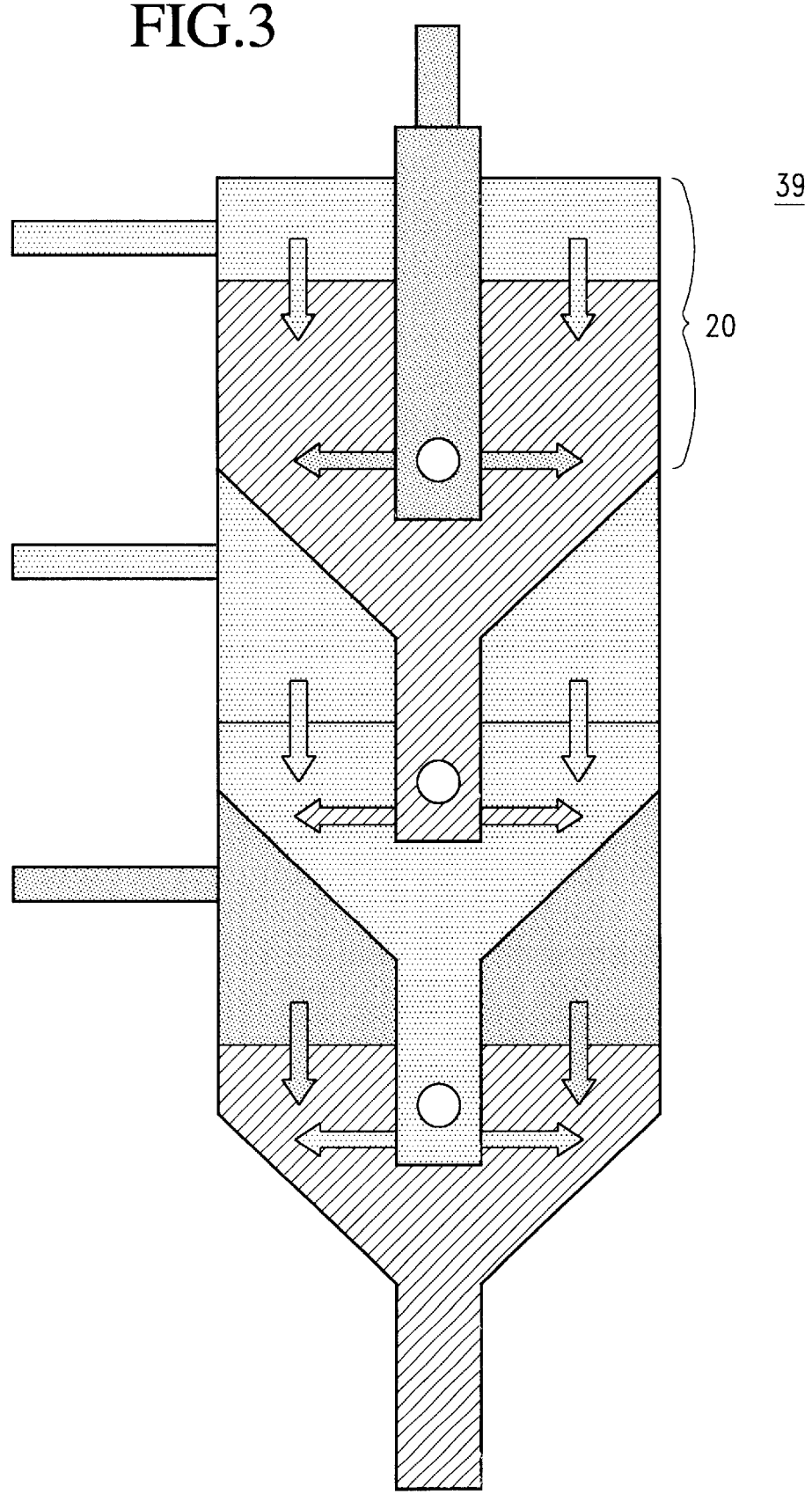
FIG. 3 is an illustration of a premixer comprising a series of premixing chambers.

Alternatively, one may use a single extended premixer 39. The extended premixer is shown in FIG. 3. Here the chamber 20 of FIG. 2 is now a part of a solitary unit that consists of a series of chambers. The exit tube for a mixture from the first chamber doubles as the entry tube in the second chamber. The exit tube from that chamber doubles as the entry tube for the third chamber. Etc. This is very similar to the chain of premixing chambers suggested above, but a single premixer is much more useful for large component systems.

The Dual-path Mixer

Figure 4:
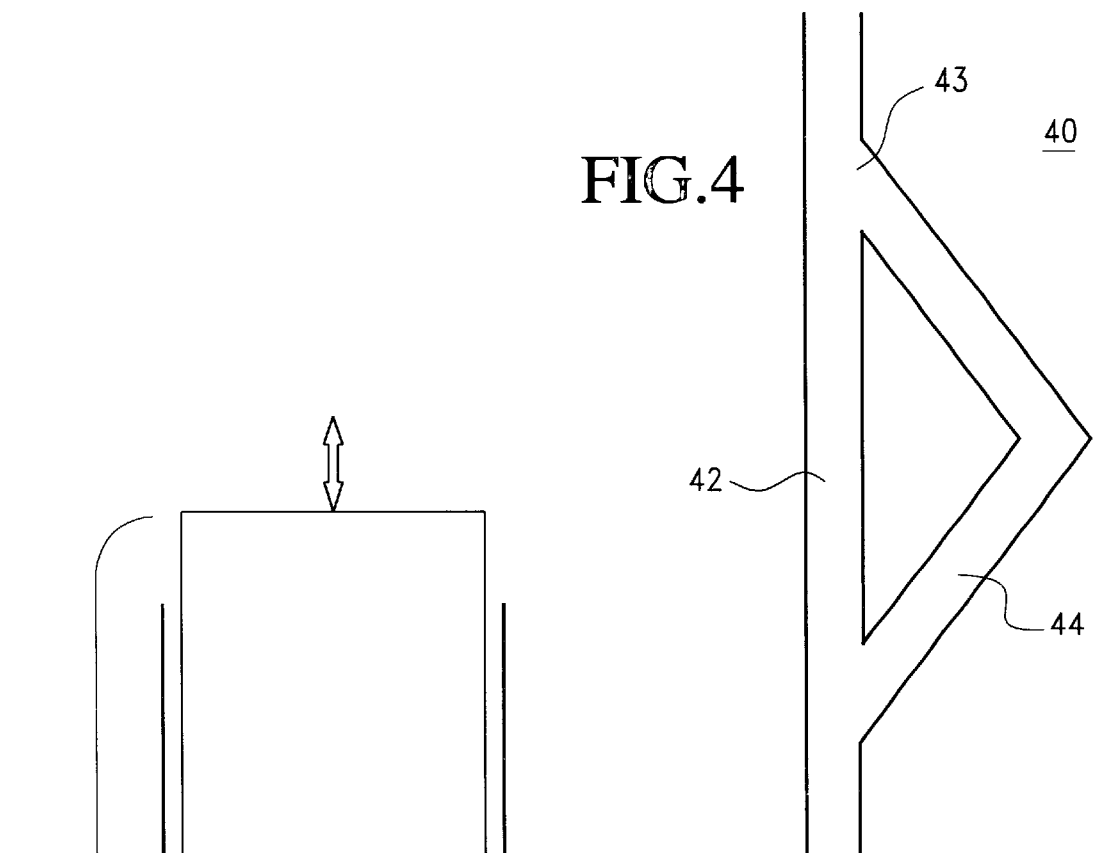
FIG. 4 is an illustration of the dual-path mixer.

After the mixture exits the static mixer discussed below, it reaches the dual-path mixer. This is illustrated in FIG. 4. The dual-path mixer 40 contains two lines: a straighter primary line 42 and a longer secondary line 44 that loops around and rejoins the primary line. Material entering the inlet 46 of the dual-path mixer is split into two pathways. After passing through one of the two lines, the material combines with material that passed through the other pathway.

It is preferable to have the secondary line 44 be wider than the primary line 42. Because the secondary line is longer, material flowing through the line is subjected to more frictional forces than material flowing through the primary line. This slows passage through the secondary line and the majority of material will flow through the primary line if the two conduits are of equal diameter. By increasing the diameter of the secondary conduit the volume to cross-sectional area ratio is increased and eventually the amount of material flowing through each conduit should approach a goal of 50%.

Material flow in the mixing system is intermittent. Substantially equal volumes of material are introduced into the system periodically. As new volumes are introduced an equal volume of material already in the line is moved further along. In the absence of a dual-path mixer, the distance the volume in the line progresses is fairly consistent. Material present at point A will progress to point B every cycle.

This fact affects the decision of how long to make the secondary line. The difference in length between the primary and secondary lines of our mixer is generally not important. However, it is desirable to avoid having material at the beginning of one volume flow merge with material at the beginning of another volume flow. Therefore, it is important that the difference in volume between the secondary line and the primary line not be a multiple of the volume that is introduced every cycle.

One potential problem with the dual-path mixer is that material in the secondary line has a longer time to react than material in the primary line. The reaction when mixing polyurethane is exothermic in nature. The reaction speed is also heat dependent. In the second line materials react longer and increase in temperature more and therefore react even faster. This means that the material in the secondary conduit will actually be at a different phase of the reaction process upon rejoining the mixture that passed through the primary conduit. This result can be prevented, or at least mitigated, by using a water jacket or other temperature controlling device to keep the dual-path mixer, or at least the secondary line, at a temperature low enough to keep the reaction speed at a desired rate.

Mixing

The first step is to mix the components together.

It is preferable that the whole mixing procedure, from the mixing of the first two components, through the pumping of the final mixture into the syringe be completed within a closed system. This prevents unwanted air from entering the chamber.

The components are kept in separate tanks 60A, 60B, and 60C. Each tank pumps its component into the premixer through a syringe type metering pump 62. The primary advantage of using syringe type metering pumps is that the metering system will remain stable even when drastic changes in pressure occur. Other pumps, such as gear pumps, cannot handle such pressure changes. Further, using a syringe type injector facilitates the creation of an airtight environment, important for preventing air bubbles from being trapped inside the mixture.

In the preferred embodiment, three directional valves 66 are used to control the flow of component to and from the syringe type metering pumps 62. When the syringes are being filled, a path is open between the tanks and the syringe. A path between the syringe and the mixing apparatus is then opened, so that components may be injected into the apparatus.

Conduits 64 connect each metering pump to the premixer. We found that the ratio of the cross-sectional area of each individual conduit to the total cross-sectional area of all the conduits should not be less than 70% or greater than 130% of the ratio of the amount of the component it transports to the combined amount of all of the components. To illustrate, if A1 is the cross-sectional area of a conduit carrying component 1, A is the cross-sectional area of all of the conduits, A=A1+A2+A3 . . . , V1 is the volume of component 1 flowing through the conduit, and V is the combined amounts of all the components, V=V1+V2+V3 . . . , then:

$$0.7*V1/V \leq A1/A \leq 1.3*V1/V$$

Optimal results are achieved when the ratio of the cross-sectional area of a conduit to the total cross-sectional area is between 85% and 115% of the ratio of the amount of the component it transports to the combined amount of all of the components. We found that by keeping the cross-sectional area within these limits we can better synchronize the starting and stopping of our process.

We also found that the system worked best if the conduits used had some limited flexibility. Optimally, they should be able to accommodate pressures between 9.0 N/cm$^2$ and 200 N/cm$^2$. The expansion rate should be such that at 200 N/cm$^2$ the conduit is at most only 20% bigger than at 9 N/cm$^2$.

Figure 1:
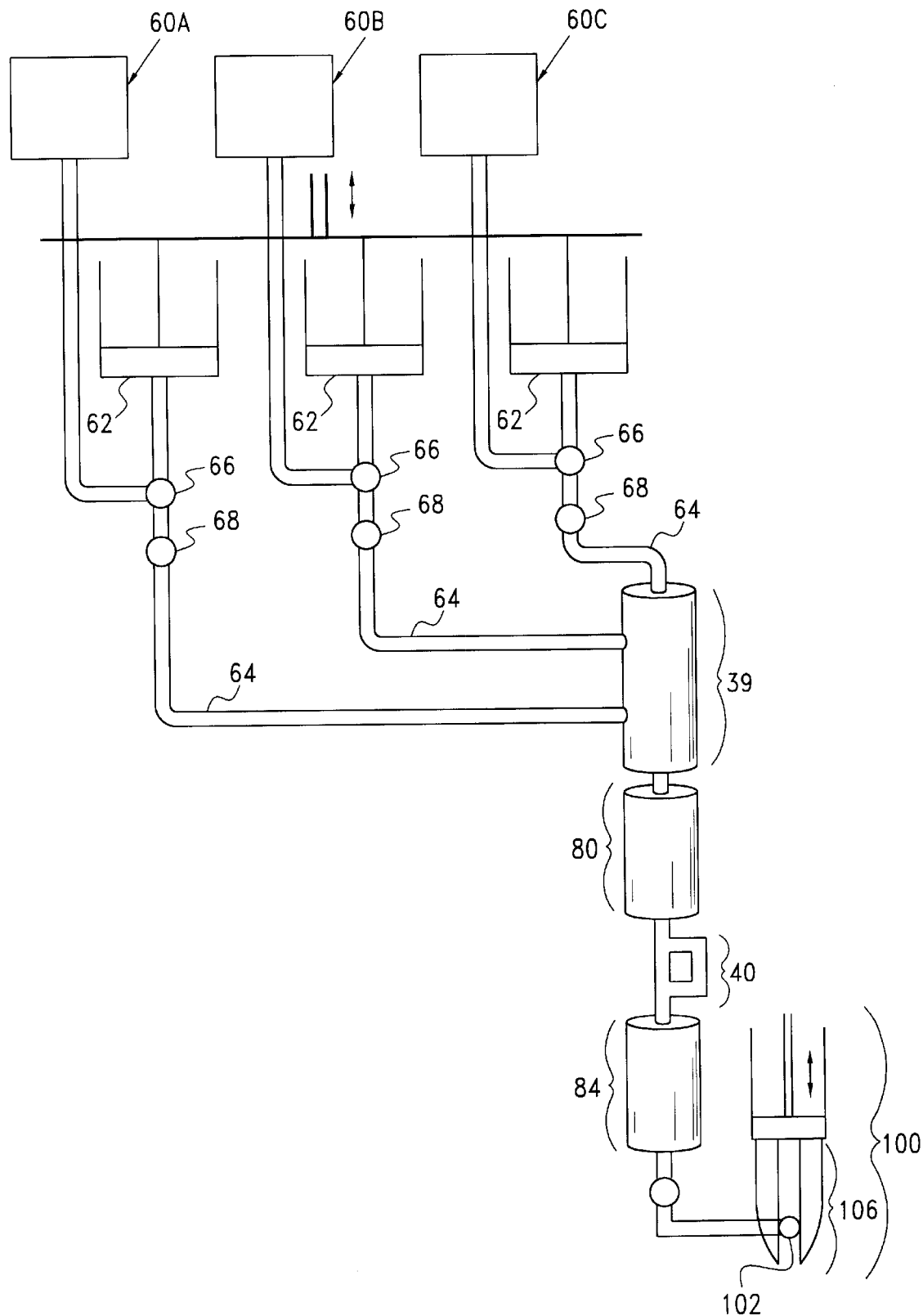
FIG. 1 is an illustration of the entire mixing apparatus.

The syringes 62 in our optimal configuration are all depressed simultaneously. See FIG. 1. Like the conduits 64 discussed above, the cross-sectional area of each syringe is also directly proportional to the relative amount of that material in the mixture. Alternatively, it would be possible to have a system where each syringe 62 was used for a particular component and was controlled individually, rather than controlled together. In the alternative case, the plunger in FIG. Y would be three separate plungers and not one. This would require a slightly more complex set up and may cost more because of more moving parts, independently automated parts, more parts period, etc.

It should be noted other kinds of pumping systems, such as gear pumps may be used.

Gear pumps are very popular in the thermosetting polyurethane industry. The gear pump works very well in continuously metered systems, but does not work well in systems that are discretely metered. If the pressure in the material circulation tube is not high enough when compared to the pressure in the mixer, we will not have an accurate ratio of the materials in the early stages of mixing, and this will cause big problems with molded parts. However, it is very difficult to build up a circulating circuit including a gear pump and a storage tank that can be kept at high pressure (>490 N/cm$^2$). It is also very difficult to maintain a steady mixing process when the pressure fluctuates.

We found that syringe type metering pumps 62 solve this problem. We can keep the pressure high enough in the mixer and conduits by using syringe type metering pumps without any unusually reinforced equipment.

Further, we found that building shut off functions between the metering pump and the premixer improves the steadiness of the rate of flow very much. We used ball type valves 68 for this purpose. These are located after the three-directional valves 66 in our preferred embodiment. When the syringe of a metering pump starts discharging a component, the valve is opened, and when the syringe finishes discharging, the valve is shut. The pressure of a component in the mixer and the tube during the interval after it is discharged can be kept at the same pressure as when it is discharged. We found that by using this system we can introduce each component in the proper amount at the proper time, and can therefore achieve an excellent mixture, even though the ratios of individual components may vary greatly. For example, this system can deal with formulations of thermosetting polyurethane where the ratio of the amount of the biggest flow component to that of the smallest flow component is more than 50:1.

The components from the first two tanks are first injected into the premixer 39. This step helps insure that the materials enter the static mixer 80 in their proper ratios and at the same rate. There they mix as described above in the section on the premixing chamber. The resultant mixture flows into a succeeding chamber in the premixer. There that mixture is premixed with a third component as described above in the section on the premixing chamber. If there are N components the premixer will comprise N-1 premixing chambers. We found that the system works best if we make the component present in the least amount the first component, the component present in the second least amount the second component, etc.

As noted above, the premixing chambers may also be separate and individually connected. The first two tanks would be connected to a premixing chamber 20, as described above. If a third component were used, a second premixing chamber would be used. If N components are present, N-1 premixing chambers will be used.

After the premixing stage the mixture is sent to a first static mixer 80. Static mixers are preferable to dynamic mixers for two primary reasons: (1) static mixers do not generate heat, and (2) static mixers enable a completely closed mixing process. Dynamic mixers generally have moving parts and mechanical seals, which generate heat. The reaction of thermosetting polyurethane becomes much quicker at higher temperatures, so we need to clean the dynamic mixer often during manufacturing. However, static mixers do not have any heat generating points, so we can achieve the temperature we want. Also, by using a static-mixer, the mixture is progressed through the static mixer as it is being mixed. We found that this is very important to sustain continuous manufacturing.

Any static mixer may be used in this process. However, the mixer we used was a spiral type mixer common in the industry. Specifically, we used Spiral Mixer 150–824 from:
Mercury Supply Systems Co., Ltd.
2-16-13, Uchi-Kanda
Chiyoda-ku, Tokyo JAPAN
Its outside diameter was 12.95 mm and its length was 221.0 mm.

The first static mixer 80 must also be kept at a temperature high enough to ensure that all the materials remain fluid throughout the mixing process. Generally, at least one of the components of a polyurethane formulation has a relatively high melting point. For the particular composition of polyurethane for which this method and apparatus was used, one of the components had to be kept at a temperature above 60 degrees centigrade. To accomplish this, a heated water jacket was wrapped around the mixer. Any other method of heating would have sufficed as well.

After the dual-path mixer the mixture may be sent through a second static mixer 84. However, neither the dual-path mixer nor additional static mixers are necessary for this invention. They may be added to minimize the possibility of inhomogeneities in the mixture so as to ensure the high quality of the final products.

After the components have been mixed, the final mixture is pumped directly into a syringe type injector 100.

We found that by controlling the temperature along separated intervals of the mixing process that we can run this system for long hours without having to do any cleaning of the lines. This also increases the number of thermosetting polyurethane formulations that may be used. Sometimes we need to keep some polyurethane components at high temperatures (at times over 60 degrees centigrade) to avoid crystallization. However, it is difficult to control the reaction speed at temperatures that high because the reaction speed of thermosetting polyurethane increases greatly at higher temperature. With our developed system, we can control temperature separately at each stage of the mixing process. Generally, the latter stage of mixing is more difficult to control at higher temperatures than the first stage of the mixing process.

Injecting

We used a syringe type injector 100 to inject material into a mold 104. The biggest advantage of using a syringe type injector is that the mixing process and the molding process can be decoupled. The preferred embodiment includes another three-directional ball valve 102. The valve may be opened along one path to allow the mixture from the mixing process into the injector. The mixing process ends with the injector being filled. A second path may then be opened between the injector and the mold.

Other types of pumps, such as gear pumps are not as useful. Gear pumps, which are generally popular in the thermosetting polyurethane industries, do not work well for injection molding systems. This is because, as discussed above, gear pumps are not able to handle large or varying pressures well.

One of our main objectives was to create a system that is completely closed from mixing to molding. It is important to avoid air bubbles in the finished products. No air bubbles are permissible in high performance parts, such as the parts that control images in printing. However, it is very difficult to avoid air bubbles in polyurethane parts, because the material is in a liquid state before it is cured. Even though we may eliminate all the air bubbles during the mixing process, it is easy for air bubbles to form during the molding process.

Figure 5:
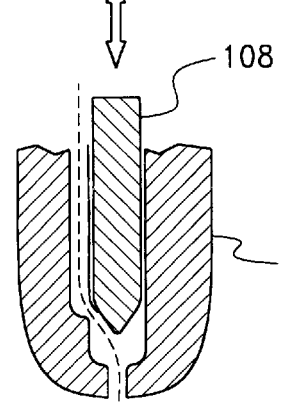
FIG. 5 is an illustration of the injector nozzle.
Figure 6:
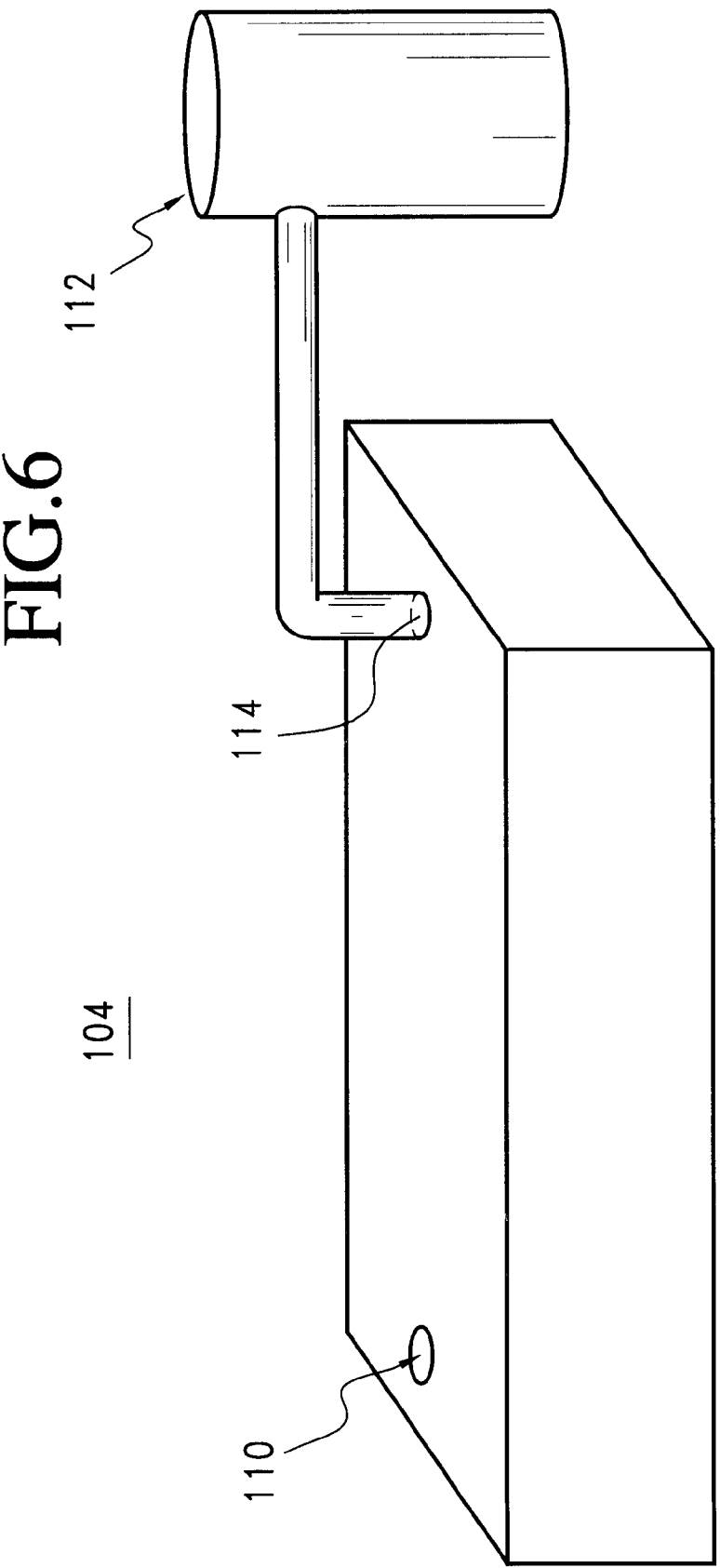
FIG. 6 is an illustration of the mold and vacuum pump.

To help eliminate this problem, we equipped the syringe injector with a shut off function at the nozzle 106 of the injector. A shut off function at the nozzle of the injector helps considerably to equalize the interval between injections, and increases the ability to achieve a good vacuum. A needle type shut off function 108 was the most effective means of halting passage through the nozzle. It is simply a needle inside the shaft of the syringe. It may be lowered to plug the nozzle, or raised to allow passage of a material through the nozzle. An injector with a needle type shut-off function is illustrated in FIG. 5.

We also equipped the mold 104 with a vacuum control system that was synchronized with the injection process to avoid trapping air bubbles during the molding process. The injector fits into an inlet 110 in the mold casing. A vacuum pump 112 is connected to another opening 116 in the casing.

First, the injection nozzle 108 is attached to the inlet of the mold 110. The nozzle 106 remains shut during this process. The attached pump 112 then vacuums the mold.

Next, the nozzle 106 of the injector 100 is opened and we inject material into the mold 104 until it is filled. Then we shut the nozzle 106 of the injector and open the vacuuming vent of the mold to the atmosphere. Finally, we release the injector from the inlet of the mold and remove the mold from the injector, so we can inject material into the next mold by the same process Some of the above steps could be done at the same time.

There is no limitation on the design for a mold, but the preferred embodiment includes a mold with a cavity that has a vacuuming vent hole on the side opposite the injection gate.

If the amount of pressure needed to inject the mixture into the mold is small enough then the mold may actually be connected directly to the end of the second static mixer. This system can work well without a syringe type injector at all. In this case, a shut off function like a shut off needle is required at the outlet side of the mixer so that the flow can be quantized.

The injection syringe is more controllable at temperatures that correspond to a pot-life of the mixture of between 5 and 60 minutes, especially when it is between 15 minutes and 30 minutes. The pot-life refers to the amount of time the mixture remains fluid after it is heated. If the temperature is too high and the pot-life is too short, cleaning will be required and it will be difficult to maintain a continuous molding process.

Therefore a means for controlling the temperature of the material in the injector should be incorporated as well. Wrapping the injector in a water jacket is one solution to the problem.

Specific Formulation

Various combinations of components may be used to make polyurethane. This process was tested using a number of different combinations of source materials. One formulation that resulted in very high-quality products consisted of the following three components.

The first component was Poly bd R-45HT, a polybutadiene-polyol with a hydroxyl number of 48.2, made by Elf Atochem North America, Inc. located at 2000 Market Street, Philadelphia, Pa. 19103. It comprised 5.0% of the total mixture.

The second component was a mixture of three different chemicals. They first was Poly-G 20-37, a polyether-polyol that has a hydroxyl number of 37, made by Arch Chemicals, Inc. located at 501 Merrit 7, Norwalk, Conn. 06856. It comprised 93.2% of the component. The second chemical was SIMULSOL TOIE, a polyether-polyol that has a hydroxyl number of 630, made by SEPPIC Inc. located at 30 Two Bridges Road, Suite 225, Fairfield, N.J. 07004. It comprises 6.6% of the component. The third component was Triisopropanolamine 99, made by the Dow Chemical Company located at 2040 Dow Center, Midland, Mich. 48674. It comprised 0.2% of the component. This component comprised 34.7% of the total mixture.

The third component was Adiprene LF900A (a urethane prepolymer), having 8.9% NCO, made by Uniroyal Chemical Company, Inc. located in Middlebury, Conn. 06746. This component comprised 60.3% of the total mixture.

Using previously known methods for mixing this formulation of polyurethane would have resulted in more flaws in the finished products. These flaws include air bubbles inhomogeneities in the mixture. Using the apparatus and process described above, the final molded products are of very high quality.

Although this system works most efficiently as a total system, each innovation and development could be combined with general casting equipment to improve the production process of molded polyurethane products generally.

While the invention has been described in connection with presently preferred embodiments thereof, those skilled in the art will recognize that many modifications and changes may be made therein without departing from the truth and scope of the invention. The present invention is intended to be limited only by the scope of the appended claims.

What is claimed is:

1. An apparatus for mixing and injection molding components for forming a thermosetting polyurethane substance, comprising:
    (a) a source for each component;
    (b) a premixing chamber, comprising a first inlet for receiving a first component, and a second inlet for receiving a second component;
    (c) conduits fluidly and hermetically connecting the sources of the first and second components to the premixing chamber;
    (d) the ratio of the cross-section area of each individual conduit to the total cross-section area of all the conduits is not less than 70% or greater than 130% of the ratio of the amount of the component it transports to the combined amount of all of the components;
    (e) the conduits further having an expandability such that when the pressure is increased from 9 N/cm² to 200 N/cm² the increase in the cross-sectional area of the conduits would be less than 20%;
    (f) a static mixer fluidly and hermetically connected to the premixing chamber;
    (g) an injector fluidly and hermetically connected to an outlet of the static mixer;
    (h) a valve located downstream from the static mixer and upstream from the injector to control low through the system;
    (i) a mold that is fluidly and hermetically connected to a nozzle of the injector; and
    (j) a means for controlling the temperature during the mixing and molding processes.

2. The apparatus of claim 1 where the injector is a syringe injector.

3. The apparatus of claim 2 including a shut off in the syringe injector comprising a needle inside of a shaft of the syringe, which may be raised or lowered to open or obstruct the nozzle.

4. The apparatus of claim 1, father comprising a vacuum pump connected to the mold.

5. The apparatus of claim 4, where the mold has a vent at an end opposite to where the nozzle of the injector connects to the mold.

6. The apparatus of claim 1, wherein the premixing chamber comprises:
    (a) a first hollow body with an inlet, the first hollow body being divided into a first chamber and a second chamber by a barrier, the barrier having a plurality of holes to admit material from the first chamber into the second chamber;
    (b) a second hollow body with an inlet, disposed inside the first hollow body, the second hollow body penetrating the barrier and having a plurality of holes located on a portion of its surface in the second chamber to allow material to pass from the interior of the second hollow body to the interior of the second chamber;
    (c) the second chamber further having an outlet that may be opened or closed.

7. The apparatus of claim 1, where a syringe metering pump is disposed between the source of each component and the premix chambers to gauge the amount of each component entering through the inlets of the premixing chambers.

8. The apparatus of claim 1, where the mold has a vent at an end opposite to where the nozzle of the injector connects to the mold.

9. An apparatus as in claim 1 wherein the injector comprises:
    (a) a syringe injector with a nozzle;
    (b) the mold being fluidly and hermetically connected to the nozzle of the syringe injector by a releasable connection; and
    (c) a shut off connected to the syringe injector comprising a needle located in the nozzle of the syringe injector.

* * * * *

UNITED STATES PATENT AND TRADEMARK OFFICE
CERTIFICATE OF CORRECTION

PATENT NO. : 6,435,854 B1
DATED : August 20, 2002
INVENTOR(S) : Eiji Sawa et al.

It is certified that error appears in the above-identified patent and that said Letters Patent is hereby corrected as shown below:

<u>Title page,</u>
Item [76], Inventors, the third inventor's name "Gary L. Raikea", should read -- Gary L. Raikes --.

Signed and Sealed this

Nineteenth Day of November, 2002

*Attest:*

*Attesting Officer*

JAMES E. ROGAN
*Director of the United States Patent and Trademark Office*